(12) United States Patent
Song

(10) Patent No.: US 11,954,457 B2
(45) Date of Patent: Apr. 9, 2024

(54) ARITHMETIC DEVICES FOR NEURAL NETWORK INCLUDING A FUNCTION STORAGE CIRCUIT AND AN ACTIVATION FUNCTION CIRCUIT

(71) Applicant: SK hynix Inc., Icheon-si (KR)

(72) Inventor: Choung Ki Song, Yongin-si (KR)

(73) Assignee: SK hynix Inc., Icheon-si (KR)

( * ) Notice: Subject to any disclaimer, the term of this patent is extended or adjusted under 35 U.S.C. 154(b) by 652 days.

(21) Appl. No.: 17/125,488

(22) Filed: Dec. 17, 2020

(65) Prior Publication Data

US 2021/0132911 A1 May 6, 2021

Related U.S. Application Data

(63) Continuation-in-part of application No. 16/919,786, filed on Jul. 2, 2020.

(60) Provisional application No. 62/959,574, filed on Jan. 10, 2020, provisional application No. 62/959,593, filed on Jan. 10, 2020, provisional application No. 62/958,614, filed on Jan. 8, 2020, provisional application No. 62/958,609, filed on Jan. 8, 2020.

(30) Foreign Application Priority Data

Oct. 31, 2019 (KR) .......................... 10-2019-0138114

(51) Int. Cl.
*G06F 7/57* (2006.01)
*G06F 7/544* (2006.01)

(52) U.S. Cl.
CPC .............. *G06F 7/57* (2013.01); *G06F 7/5443* (2013.01)

(58) Field of Classification Search
CPC ........................................................ G06F 7/57
See application file for complete search history.

(56) References Cited

U.S. PATENT DOCUMENTS

| 6,414,687 | B1 | 7/2002 | Gibson |
| 10,592,247 | B2 | 3/2020 | Tanaka |
| 11,062,202 | B2 * | 7/2021 | James ................. G06N 3/063 |
| 2014/0067889 | A1 | 3/2014 | Mortensen et al. |
| 2017/0365306 | A1 | 12/2017 | Ouyang et al. |
| 2020/0019847 | A1 * | 1/2020 | Krishnamurthy ...... G06N 3/063 |

FOREIGN PATENT DOCUMENTS

| CN | 109964209 A | 7/2019 |
| CN | 110009092 A | 7/2019 |
| CN | 110060714 A | 7/2019 |
| KR | 1020180053314 A | 5/2018 |

(Continued)

*Primary Examiner* — Michael D. Yaary
(74) *Attorney, Agent, or Firm* — William Park & Associates Ltd.

(57) ABSTRACT

An arithmetic device includes a function storage circuit and an activation function (AF) circuit. The function storage circuit stores and outputs a function selection signal, a first function information signal, and a second function information signal. The AF circuit generates an activation function result data by applying a slope value and a maximum value to a multiplication/accumulation (MAC) result data in a function setting mode that is activated by the function selection signal. The slope value is set based on the first function information signal, and the maximum value is set based on the second function information signal.

29 Claims, 26 Drawing Sheets

(56) References Cited

FOREIGN PATENT DOCUMENTS

| KR | 1020190054454 A | 5/2019 |
|----|-----------------|--------|
| KR | 102032146 B1 | 10/2019 |
| KR | 1020190116024 A | 10/2019 |

\* cited by examiner

FIG.13

| CA<1> | FSEL | DESCRIPTION |
|-------|------|-------------|
| 'L' | 'L' | FUNCTION SETTING MODE EXIT |
| 'H' | 'H' | FUNCTION SETTING MODE ENTRY |

FIG.18

| BITS | DESCRIPTION |
|---|---|
| CA<8:1> | Leaky ReLU slope value |

FIG.20

| CA<4:2> | MAX VALUE FOR ReLU-MAX |
|---------|------------------------|
| '000'   | X                      |
| '001'   | '1'                    |
| '010'   | '2'                    |
| '011'   | '3'                    |
| '100'   | '4'                    |
| '101'   | '5'                    |
| '110'   | '6'                    |
| '111'   | '7'                    |

ARITHMETIC DEVICES FOR NEURAL NETWORK INCLUDING A FUNCTION STORAGE CIRCUIT AND AN ACTIVATION FUNCTION CIRCUIT

CROSS-REFERENCE TO RELATED APPLICATIONS

The present application is a continuation-in-part of U.S. patent application Ser. No. 16/919,786, filed on Jul. 2, 2020, which claims priority under 35 U.S.C 119(a) to Korean Application No. 10-2019-0138114, filed on Oct. 31, 2019, Provisional Patent Application No. 62/958,614, filed on Jan. 8, 2020, Provisional Patent Application No. 62/958,609, filed on Jan. 8, 2020, Provisional Patent Application No. 62/959,574, filed on Jan. 10, 2020, and Provisional Patent Application No. 62/959,593, filed on Jan. 10, 2020, which is incorporated herein by reference in its entirety.

BACKGROUND

1. Technical Field

Embodiments of the present disclosure generally relate to arithmetic devices for a neural network.

2. Related Art

In a neural network, neurons mathematically modelled to resemble to a human brain are connected to each other to form a network. Recently, neural network technologies have been developed fast. Accordingly, a lot of effort has been focused on analyzing input data and extracting useful information using the neural network technologies in various electronic devices.

SUMMARY

According to an embodiment, an arithmetic device includes a function storage circuit and an activation function (AF) circuit. The function storage circuit is configured to store and output a function selection signal, a first function information signal, and a second function information signal. The AF circuit generates an activation function result data by applying a slope value and a maximum value to a multiplication/accumulation (MAC) result data in a function setting mode that is activated by the function selection signal. The slope value is set based on the first function information signal, and the maximum value is set based on the second function information signal.

According to an embodiment, an arithmetic device includes an input control circuit, a slope setting circuit, and a maximum value setting circuit. The input control circuit is configured to generate multiplication/accumulation (MAC) data based on a function selection signal and a MAC result data. The slope setting circuit is configured to generate a slope set data by applying a slope value to the MAC data based on a first function information signal. The maximum value setting circuit is configured to generate an activation function result data by applying a maximum value to the slope set data based on a second function information signal.

According to an embodiment, an arithmetic device includes a slope setting circuit and a maximum value setting circuit. The slope setting circuit is configured to receive a multiplication/accumulation (MAC) data, in a function setting mode, based on a function selection signal and a MAC result data and configured to generate slope set data by applying a slope value to the MAC data based on a first function information signal. The maximum value setting circuit is configured to generate an activation function result data by applying a maximum value to the slope set data based on a second function information signal.

BRIEF DESCRIPTION OF THE DRAWINGS

FIG. 13 is a table illustrating an operation of the function selection signal storage circuit illustrated in FIG. 12.

FIG. 18 is a table illustrating an operation of the first function information signal storage circuit illustrated in FIG. 17.

FIG. 20 is a table illustrating an operation of the second function information signal storage circuit illustrated in FIG. 19.

DETAILED DESCRIPTION

Various embodiments of the present disclosure will be described hereinafter with reference to the accompanying drawings. However, the embodiments described herein are for illustrative purposes only and are not intended to limit the scope of the present disclosure.

It will be understood that although the terms "first", "second", "third" etc. are used herein to describe various elements, these elements should not be limited by these terms. These terms are only used to distinguish one element from another element. Thus, a first element in some embodiments could be termed a second element in other embodiments without departing from the teachings of the present disclosure.

Further, it will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
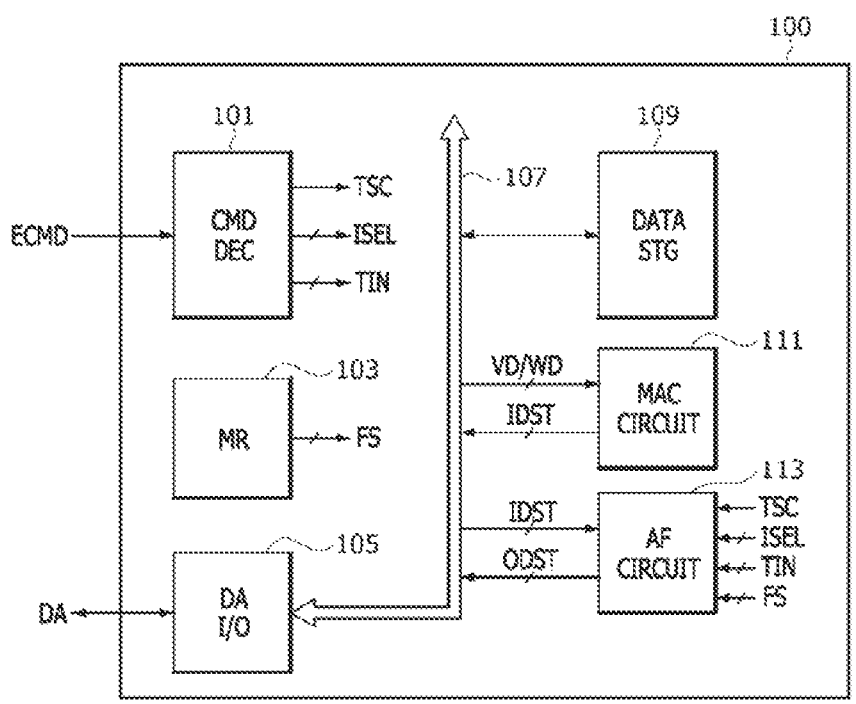
FIG. 1 is a block diagram illustrating a configuration of an arithmetic device according to an embodiment of the present disclosure.

As illustrated in FIG. 1, an arithmetic device 13 may include a command decoder 101, a mode register 103, a data input/output circuit 105, a data line 107, a data storage circuit 109, a multiplication/accumulation (MAC) circuit 111 and an AF circuit 113.

The command decoder 101 may generate a table set signal TSC, an input selection signal ISEL, and a table input signal TIN based on an external command ECMD. The number of bits that are included in the input selection signal ISEL may be set to be different according to the embodiments. The number of bits that are included in the table input signal TIN may be set to be different according to the embodiments.

The command decoder 101 may decode external command ECMD to generate the table set signal TSC. The table set signal TSC may be activated to store an activation function used for a neural network in a first table storage circuit (133 of FIG. 3) in a look-up table form. The number of bits that are included in the external command ECMD for activating the table set signal TSC may be set to be different according to the embodiments. In addition, a logic level combination of the external command ECMD for activating the table set signal TSC may be set to be different according to the embodiments. The lookup table has a table form that contains information about an input value and the output value corresponding to the input value. When using the lookup table, the output value corresponding to the input value can be printed directly without any arithmetic, thus improving the arithmetic speed.

The command decoder 101 may decode the external command ECMD to generate the input selection signal ISEL and the table input signal TIN. The input selection signal ISEL and the table input signal TIN may be generated to store the activation function in first to $N^{th}$ variable latches (149_1~149_N of FIG. 4) included in the first table storage circuit (133 of FIG. 3) in a look-up table form. The table input signal TIN may be stored in one variable latch selected by the input selection signal ISEL among the first to $N^{th}$ variable latches (149_1~149_N of FIG. 4). A logic level combination of the external command ECMD for setting logic level combinations of the table input signal TIN may be set to be different according to the embodiments. A logic level combination of the external command ECMD for setting logic level combinations of the input selection signal ISEL may be set to be different according to the embodiments.

The mode register 103 may store a function selection signal FS through a mode register set. The mode register 103 may output the function selection signal FS through a mode register read. The mode register set and the mode register read are common operations for the mode register 139, so the specific description is omitted. The mode register 103 may apply the function selection signal FS to the AF circuit 113. The function selection signal FS may be generated to select one of various activation functions which are used for a neural network. The various activation functions used for a neural network may include, but are not limited to, sigmoid (i.e., sigmoid function), Tan h (i.e., hyperbolic tangent activation function), ReLU (i.e., rectified linear unit function), leaky ReLU (i.e., leaky rectified linear unit function), Maxout (i.e., max out activation function), and an activation function which is input based on the external command ECMD. The number of bits that are included in the function selection signal FS may be set to be different according to the embodiments. The mode register 103 can be located on the external side of the arithmetic device 13, for example, on a host or a memory controller.

The data input/output circuit 105 may receive external data DA from the external side of the arithmetic device 13, and transmit the external data DA to at least one of the data storage circuit 109 and the MAC circuit 111 through the data line 107. The data input/output circuit 105 may output data from at least one of the data storage circuit 109, the MAC circuit 111 and the AF circuit 113 through the data line 107 to the external data DA.

The data storage circuit 109 may be stored internally by receiving the external data DA received from the data input/output circuit 105 through the data line 107 in a write operation. The data storage circuit 109 may transmit the data stored internally to the data input/output circuit 105 through the data line 107 and output it to the external data DA in read operation.

The MAC circuit 111 may receive a vector data VD and a weight data WD. The MAC circuit 111 may receive the vector data VD from the data input/output circuit 105 or data storage circuit 109. The MAC circuit 111 may receive the weight data WD from the data input/output circuit 105 or data storage circuit 109. The MAC circuit 111 may perform MAC arithmetic operation on the vector data VD and the weight data WD, and generate an input distribution signal IDST based on the results of MAC arithmetic operation.

The MAC arithmetic operation may include a multiplying operation and an accumulating operation for the vector data VD and the weight data WD. When the vector data VD and the weight data WD are implemented in matrix format, the MAC arithmetic operations may include multiple multiplying operations and multiple accumulating operations for elements contained in matrix with the vector data VD implemented and elements contained in matrix with the weight data WD implemented. In the neural network, the MAC arithmetic operations are performed to classify features contained in an input layer into resulting values contained in an output layer. The vector data VD may contain information about features contained in the input layer. The weight data WD may contain information about the influence on classifying features of the input layers as results contained in the output layers. The MAC circuit 111 may receive an output distribution signal ODST from the AF circuit 113 as the vector data VD when multiple layers are applied in perceptron.

The AF circuit 113 may store the activation functions used for a neural network in the first table storage circuit (133 of FIG. 3) in a look-up table form, based on the table set signal TSC, the input selection signal ISEL, and the table input signal TIN. The lookup table stored in the AF circuit 113 includes information on the relationship between the input distribution signal IDST and the output distribution signal ODST. The output distribution signal ODST can be defined as the value derived when the input distribution signal IDST is applied to an activation function. The AF circuit 113 may store the table input signal TIN in one variable latch selected by the input selection signal ISEL among the first to $N^{th}$ variable latches (149_1~149_N of FIG. 4) when the table set signal TSC is activated. Various activation functions used for a neural network, for example, sigmoid, Tan h, ReLU, leaky ReLU, and Maxout may be hardwired into the AF circuit 113. The number of the activation functions hardwired in the AF circuit 113 may be set to be different according to the embodiments.

The AF circuit 113 may select one of the various activation functions based on the function selection signal FS. The AF circuit 113 may generate a result value provided by an activation function selected by the function selection signal FS based on the input distribution signal IDST. The AF circuit 113 may extract a result value corresponding to the input distribution signal IDST from a look-up table to which an activation function selected by the function selection signal FS is applied, thereby outputting the result value as an output distribution signal ODST. A configuration and an operation of the AF circuit 113 will be described with reference to FIGS. 3 to 7.

Figure 2:
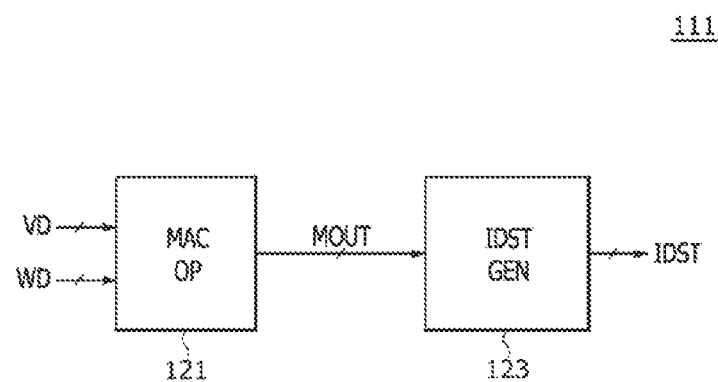
FIG. 2 is a block diagram illustrating a configuration of a multiplication/accumulation (MAC) circuit included in the arithmetic device of FIG. 1.

Referring to FIG. 2, the MAC circuit 111 may include a MAC operator 121 and an input distribution signal generation circuit 123. The MAC operator 121 may receive the vector data VD and the weight data WD and may perform the MAC arithmetic operation including a multiplying operation and an accumulating operation to generate an arithmetic result signal MOUT. The input distribution signal generation circuit 123 may extract only some bits among bits of the arithmetic result signal MOUT to generate the input distribution signal IDST. For example, when the arithmetic result signal MOUT contains bits corresponding to the integer and bits corresponding to the decimal part, the input distribution signal IDST can be selected as the bits corresponding to the integer from among the bits contained in the arithmetic result signal MOUT. The number of bits of the arithmetic result signal MOUT may be set to be different according to the embodiments. In addition, the number of bits of the input distribution signal IDST may also be set to be different according to the embodiments. The number of bits of the input distribution signal IDST may be set to be less than the number of bits of the arithmetic result signal MOUT.

Figure 3:
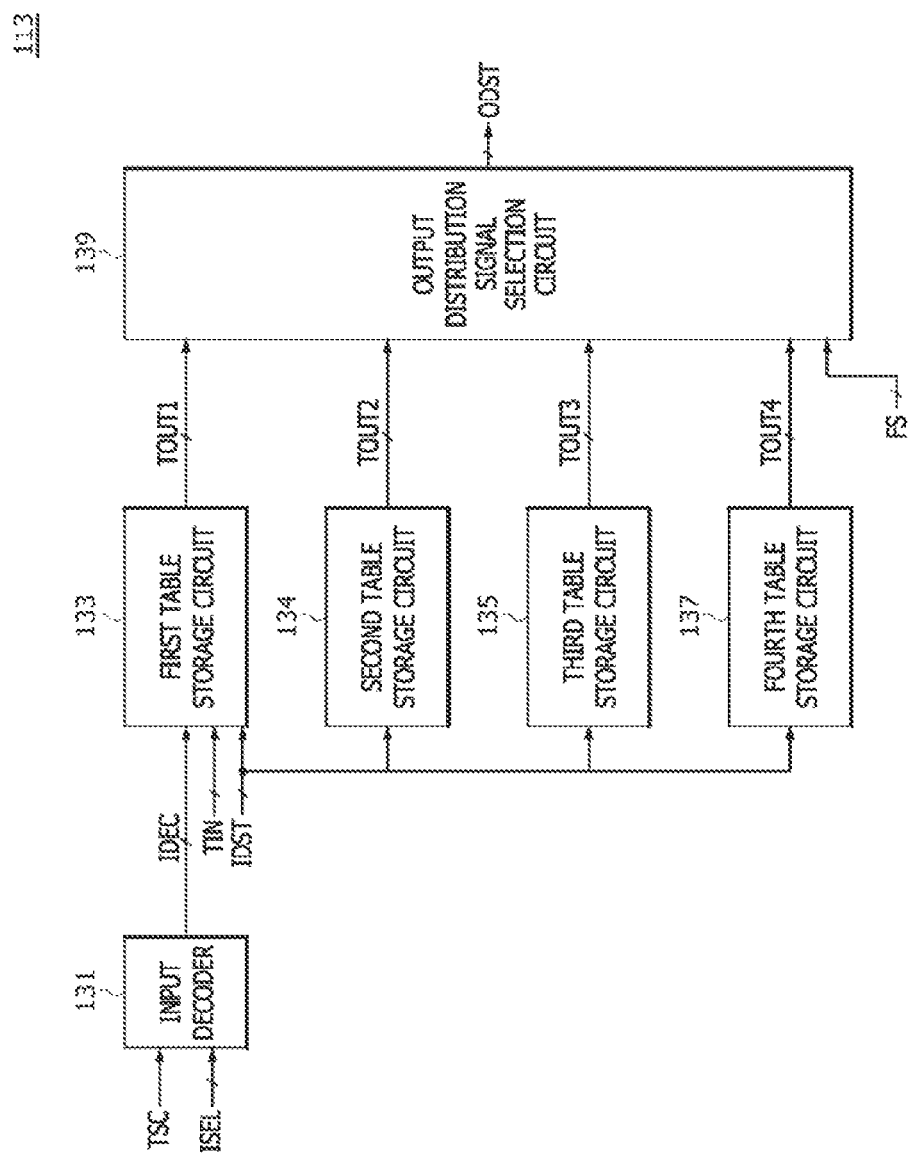
FIG. 3 is a block diagram illustrating a configuration of an AF circuit included in the arithmetic device of FIG. 1.

Referring to FIG. 3, the AF circuit 113 may include an input decoder 131, the first table storage circuit 133, a second table storage circuit 134, a third table storage circuit 135, a fourth table storage circuit 137, and an output distribution signal selection circuit 139.

The input decoder 131 may generate a decoded input signal IDEC based on the table set signal TSC and the input selection signal ISEL. The input decoder 131 may decode the input selection signal ISEL to generate the decoded input signal IDEC when the table set signal TSC is activated.

The first table storage circuit 133 may store the table input signal TIN and may output a first table output signal TOUT1, based on the decoded input signal IDEC and the input distribution signal IDST. The first table storage circuit 133 may store the table input signal TIN as a first activation function with a look-up table form based on the decoded input signal IDEC. The first table storage circuit 133 may output a result value of the first activation function as the first table output signal TOUT1 based on the input distribution signal IDST. A configuration and an operation of the first table storage circuit 133 will be described with reference to FIGS. 4 to 6.

A second activation function may be hardwired into the second table storage circuit 134. The second table storage circuit 134 may include logic circuits implemented in hardware with the second activation function. The second activation function may be set as one of sigmoid, Tan h, ReLU, leaky ReLU, and Maxout. The second table storage circuit 134 may output a result value of the second activation function stored in a look-up table form as a second table output signal TOUT2 based on the input distribution signal IDST. A configuration and an operation of the second table storage circuit 134 will be described with reference to FIG. 7.

A third activation function may be hardwired into the third table storage circuit 135. The third table storage circuit 135 may include logic circuits implemented in hardware with the third activation function. The third activation function may be set as one of sigmoid, Tan h, ReLU, leaky ReLU, and Maxout. The third activation function may be set to be different from the second activation function. The third table storage circuit 135 may output a result value of the third activation function stored in a look-up table form as a third table output signal TOUT3 based on the input distribution signal IDST.

A fourth activation function may be hardwired into the fourth table storage circuit 137. The fourth table storage circuit 137 may include logic circuits implemented in hardware with the fourth activation function. The fourth activation function may be set as one of sigmoid, Tan h, ReLU, leaky ReLU, and Maxout. The fourth activation function may be set to be different from the second and third activation functions. The fourth table storage circuit 137 may output a result value of the fourth activation function stored in a look-up table form as a fourth table output signal TOUT4 based on the input distribution signal IDST.

The output distribution signal selection circuit 139 may generate the output distribution signal ODST from the first table output signal TOUT1, the second table output signal TOUT2, the third table output signal TOUT3, and the fourth table output signal TOUT4 based on the function selection signal FS. The output distribution signal selection circuit 139 may output the first table output signal TOUT1 as the output distribution signal ODST when the function selection signal FS has a first logic level combination. The output distribution signal selection circuit 139 may output the second table output signal TOUT2 as the output distribution signal ODST when the function selection signal FS has a second logic level combination. The output distribution signal selection circuit 139 may output the third table output signal TOUT3 as the output distribution signal ODST when the function selection signal FS has a third logic level combination. The output distribution signal selection circuit 139 may output the fourth table output signal TOUT4 as the output distribution signal ODST when the function selection signal FS has a fourth logic level combination.

Figure 4:
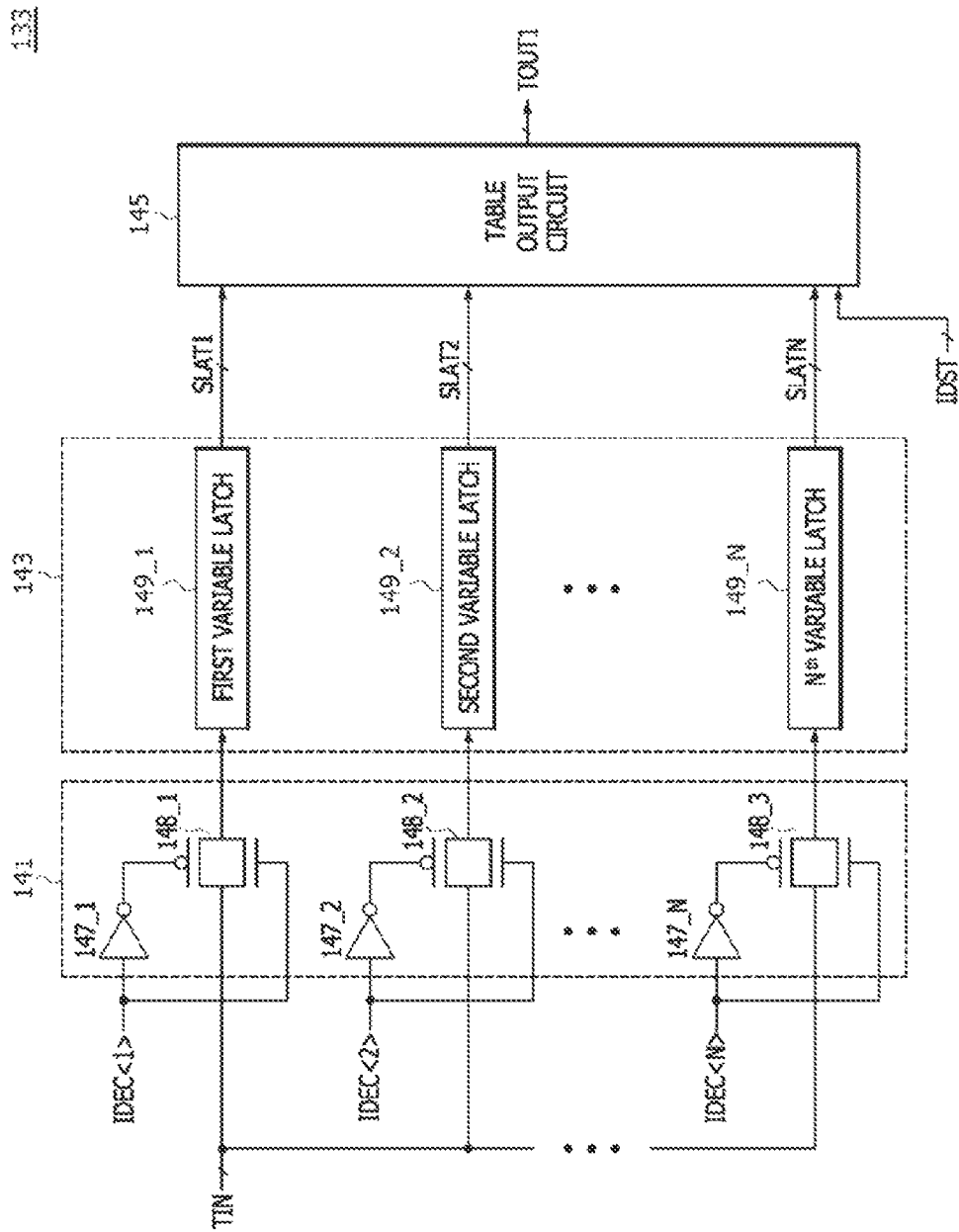
FIG. 4 illustrates a configuration of a first table storage circuit included in the AF circuit of FIG. 3.

Referring to FIG. 4, the first table storage circuit 133 may include a decoded signal input circuit 141, a variable latch circuit 143, and a table output circuit 145.

The decoded signal input circuit 141 may include inverters 147_1~147_N and transfer gates 148_1~148_N. The inverter 147_1 may inversely buffer a first bit signal of the decoded input signal IDEC<1> to output the inversely buffered signal of the first bit signal of the decoded input signal IDEC<1>. The inverter 147_2 may inversely buffer a second bit signal of the decoded input signal IDEC<2> to output the inversely buffered signal of the second bit signal of the decoded input signal IDEC<2>. The inverter 147_N may inversely buffer an $N^{th}$ bit signal of the decoded input signal IDEC<N> to output the inversely buffered signal of the $N^{th}$ bit signal of the decoded input signal IDEC<N>. The transfer gate 148_1 may be turned on to transfer the table input signal TIN to a first variable latch 149_1 when the first bit signal of the decoded input signal IDEC<1> has a logic "high" level. The transfer gate 148_2 may be turned on to transfer the table input signal TIN to a second variable latch 149_2 when the second bit signal of the decoded input signal IDEC<2> has a logic "high" level. The transfer gate 148_N may be turned on to transfer the table input signal TIN to an $N^{th}$ variable latch 149_N when the $N^{th}$ bit signal of the decoded input signal IDEC<N> has a logic "high" level.

The decoded signal input circuit 141 may transfer the table input signal TIN to the first to $N^{th}$ variable latches 149_1~149_N included in the variable latch circuit 143 based on the decoded input signal IDEC. The decoded signal input circuit 141 may receive the table input signal TIN through a path selected by the decoded input signal IDEC to transfer the table input signal TIN to the first to $N^{th}$ variable latches 149_1~149_N included in the variable latch circuit 143.

The variable latch circuit 143 may include the first to $N^{th}$ variable latches 149_1~149_N. The first variable latch 149_1 may receive and store the table input signal TIN through the transfer gate 148_1 turned on when the first bit signal IDEC<1> of the decoded input signal IDEC has a logic "high" level and may output the stored table input signal TIN as a first variable latch signal SLAT1. The second variable latch 149_2 may receive and store the table input signal TIN through the transfer gate 148_2 turned on when the second bit signal IDEC<2> of the decoded input signal IDEC has a logic "high" level and may output the stored table input signal TIN as a second variable latch signal SLAT2. The $N^{th}$ variable latch 149_N may receive and store the table input signal TIN through the transfer gate 148_N turned on when the $N^{th}$ bit signal IDEC<N> of the decoded input signal IDEC has a logic "high" level and may output the stored table input signal TIN as an $N^{th}$ variable latch signal SLATN.

The table output circuit 145 may select one of the first to $N^{th}$ variable latch signals SLAT1~SLATN as a result value of the activation function based on the input distribution signal IDST, thereby outputting the selected variable latch signal as the first table output signal TOUT1. The table output circuit 145 may select one of the first to $N^{th}$ variable latch signals SLAT1~SLATN as the first table output signal TOUT1 according to a logic level combination of the input distribution signal IDST or according to a decoded signal of the input distribution signal IDST. A configuration and an operation of the table output circuit 145 will be described with reference to FIGS. 5 and 6.

Figure 5:
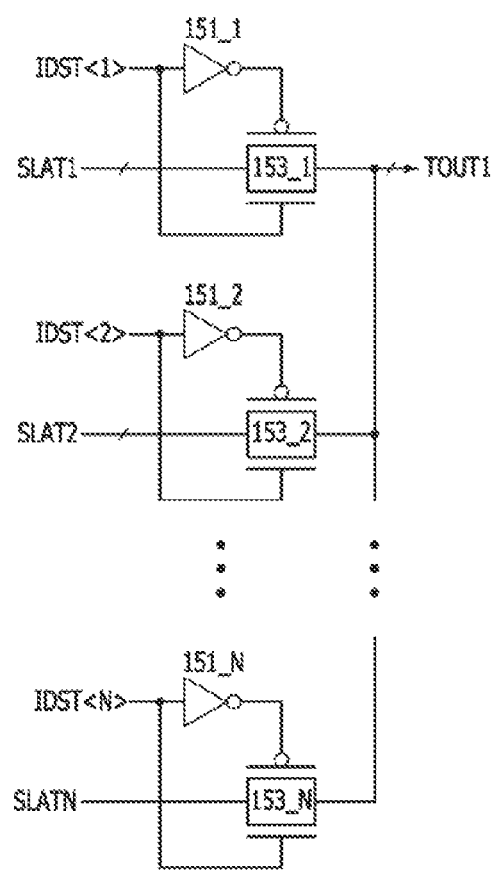
FIGS. 5 and 6 are circuit diagrams illustrating examples of a table output circuit included in the first table storage circuit of FIG. 4.

Referring to FIG. 5, a table output circuit 145a corresponding to an example of the table output circuit 145 may include inverters 151_1, 151_2, . . . , and 151_N and transfer gates 153_1, 153_2, . . . , and 153_N. The inverter 151_1 may inversely buffer a first bit signal of the input distribution signal IDST<1> to output the inversely buffered signal of the first bit signal of the input distribution signal IDST<1>. The inverter 151_2 may inversely buffer a second bit signal of the input distribution signal IDST<2> to output the inversely buffered signal of the second bit signal of the input distribution signal IDST<2>. The inverter 151_N may inversely buffer an $N^{th}$ bit signal of the input distribution signal IDST<N> to output the inversely buffered signal of the $N^{th}$ bit signal of the input distribution signal IDST<N>. The transfer gate 153_1 may be turned on to output the first variable latch signal SLAT1 as the first table output signal TOUT1 when the first bit signal of the input distribution signal IDST<1> has a logic "high" level. The transfer gate 153_2 may be turned on to output the second variable latch signal SLAT2 as the first table output signal TOUT1 when the second bit signal of the input distribution signal IDST<2> has a logic "high" level. The transfer gate 153_N may be turned on to output the $N^{th}$ variable latch signal SLATN as the first table output signal TOUT1 when the $N^{th}$ bit signal of the input distribution signal IDST<N> has a logic "high" level.

Figure 6:
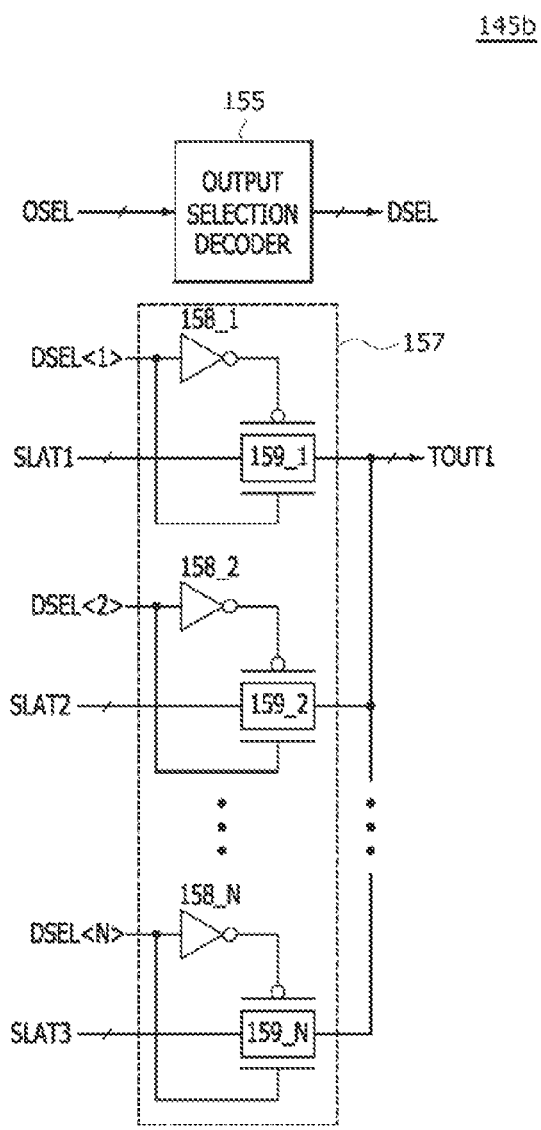

Referring to FIG. 6, a table output circuit 145b corresponding to another example of the table output circuit 145 may include an output selection decoder 155 and a decoded signal output circuit 157. The output selection decoder 155 may decode the input distribution signal IDST to generate a decoded selection signal DSEL. The decoded signal output circuit 157 may include inverters 158_1, 158_2, . . . , and 158_N and transfer gates 159_1, 159_2, . . . , and 159_N. The inverter 158_1 may inversely buffer a first bit signal of the decoded selection signal DSEL<1> to output the inversely buffered signal of the first bit signal of the decoded selection signal DSEL<1>. The inverter 1582 may inversely buffer a second bit signal of the decoded selection signal DSEL<2> to output the inversely buffered signal of the second bit signal of the decoded selection signal DSEL<2>. The inverter 158_N may inversely buffer an $N^{th}$ bit signal of the decoded selection signal DSEL<N> to output the inversely buffered signal of the $N^{th}$ bit signal of the decoded selection signal DSEL<N>. The transfer gate 159_1 may be turned on to output the first variable latch signal SLAT1 as the first table output signal TOUT1 when the first bit signal of the decoded selection signal DSEL<1> has a logic "high" level. The transfer gate 159_2 may be turned on to output the second variable latch signal SLAT2 as the first table output signal TOUT1 when the second bit signal of the decoded selection signal DSEL<2> has a logic "high" level. The transfer gate 159_N may be turned on to output the $N^{th}$ variable latch signal SLATN as the first table output signal TOUT1 when the $N^{th}$ bit signal of the decoded selection signal DSEL<N> has a logic "high" level.

Figure 7:
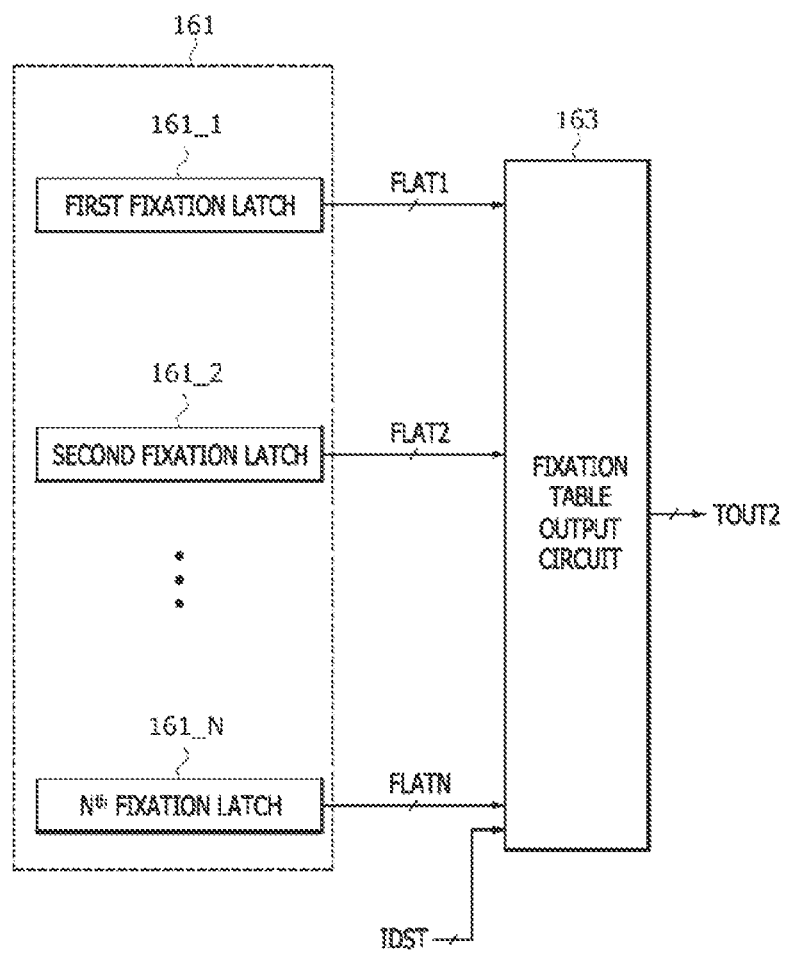
FIG. 7 is a block diagram illustrating a configuration of a second table storage circuit included in the AF circuit of FIG. 3.

Referring to FIG. 7, the second table storage circuit 134 may include a fixation latch circuit 161 and a fixation table output circuit 163. The fixation latch circuit 161 may include first to $N^{th}$ fixation latches 161_1~161_N. A first fixation latch signal FLAT1 may be hardwired in the first fixation latch 161_1 as a hardware. A second fixation latch signal FLAT2 may be hardwired in the second fixation latch 161_2 as a hardware. An $N^{th}$ fixation latch signal FLATN may be hardwired in the $N^{th}$ fixation latch 161_N as a hardware. Each of the first to $N^{th}$ fixation latch signals FLAT1~FLATN stored in the first to $N^{th}$ fixation latches 161_1~161_N may be a result value for storing one of sigmoid, Tan h, ReLU, leaky ReLU, and Maxout in a look-up table form. Logic level combinations of the input distribution signal IDST may be set to correspond to the first to $N^{th}$ fixation latch signals FLAT1~FLATN, respectively. The fixation table output circuit 163 may select one of the first to $N^{th}$ fixation latch signals FLAT1~FLATN as a result value of the activation function based on the input distribution signal IDST, thereby outputting the selected variable latch signal as the second table output signal TOUT2. Each of the third and fourth table storage circuits 25 and 26 illustrated in FIG. 3 may have the same configuration as the second table storage circuit 134 illustrated in FIG. 7.

The arithmetic device 100 with an aforementioned configuration may receive information on the activation function used for a neural network as a command and an address to store the information in a look-up table form. Thus, various activation functions set to be different from each other may be applied to the neural network without any design changes.

Figure 8:
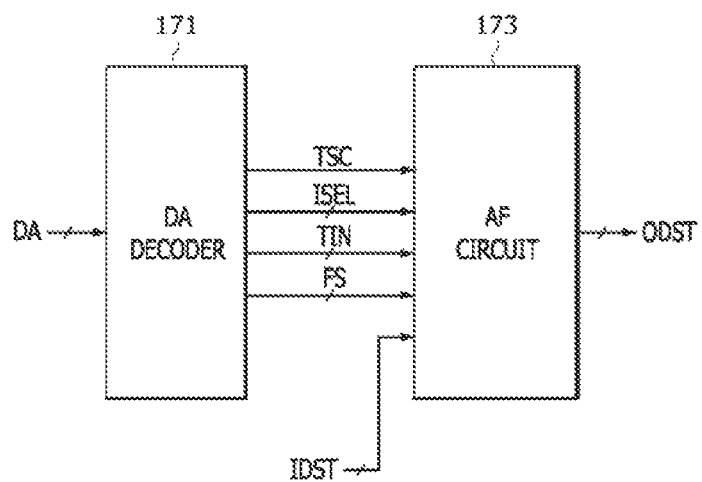
FIG. 8 is a block diagram illustrating a configuration of an arithmetic device according to another embodiment of the present disclosure.

Referring to FIG. 8, an arithmetic device 100a according to another embodiment may include an external data decoder 171 and an AF circuit 173.

The external data decoder 171 may receive external data DA to set and output a table set signal TSC, an input selection signal ISEL, a table input signal TIN, and a function selection signal FS. The external data decoder 171 may generate the table set signal TSC, the input selection signal ISEL, the table input signal TIN, and the function selection signal FS from the external data DA which are sequentially input to the external data decoder 171.

The AF circuit 173 may store activation functions used for a neural network in a look-up table form, based on the table set signal TSC, the input selection signal ISEL, and the table input signal TIN. Various activation functions may be hardwired in the AF circuit 173. The AF circuit 173 may output a result value of an activation function, which is selected by the function selection signal FS based on an input distribution signal IDST, as an output distribution signal ODST. A configuration and an operation of the AF circuit 173 may be the same as a configuration and an operation of the AF circuit 113 illustrated in FIG. 1. Thus, descriptions of the AF circuit 173 will be omitted hereinafter.

The arithmetic device 100a with the aforementioned configurations may receive information on the activation function used for a neural network as data to store the information in a look-up table form. Thus, various activation functions set to be different from each other may be applied to the neural network without any design changes.

Figure 9:
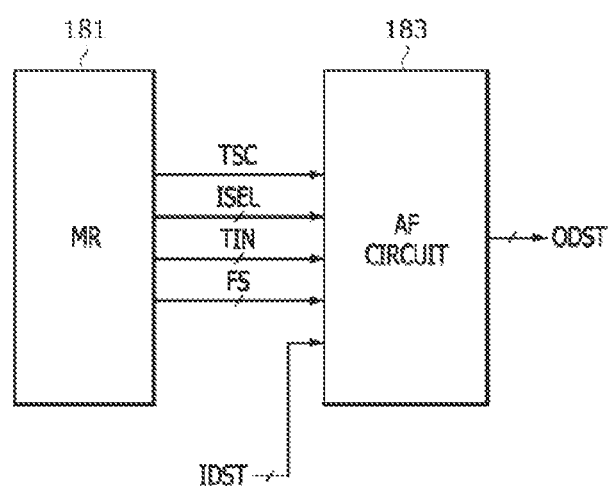
FIG. 9 is a block diagram illustrating a configuration of an arithmetic device according to still another embodiment of the present disclosure.

Referring to FIG. 9, an arithmetic device 100b according to still another embodiment may include a mode register 181 and an AF circuit 183.

The mode register 181 may store a table set signal TSC, an input selection signal ISEL, a table input signal TIN, and a function selection signal FS through a mode register set. The mode register 181 may output the table set signal TSC, the input selection signal ISEL, the table input signal TIN, and the function selection signal FS through a mode register read.

The AF circuit 183 may store activation functions used for a neural network in a look-up table form, based on the table set signal TSC, the input selection signal ISEL, and the table input signal TIN. Various activation functions may be hardwired in the AF circuit 183. The AF circuit 183 may output a result value of an activation function, which is selected by the function selection signal FS based on an input distribution signal IDST, as an output distribution signal ODST. A configuration and an operation of the AF circuit 183 may be the same as a configuration and an operation of the AF circuit 113 illustrated in FIG. 1. Thus, descriptions of the AF circuit 183 will be omitted hereinafter.

The arithmetic device 100b with the aforementioned configurations may store information on the activation function used for a neural network in a look-up table form based on information stored in the mode register 181. Thus, various activation functions set to be different from each other may be applied to the neural network without any design changes.

The arithmetic device 100 illustrated in FIG. 1, the arithmetic device 100a illustrated in FIG. 8, and the arithmetic device 100b illustrated in FIG. 9 can be included in memory modules that receive the external command through hosts and memory controllers. Memory modules can be implemented as single in-line memory module (SIMM), dual inline memory module (DIMM), and high bandwidth memory (HBM).

Figure 10:
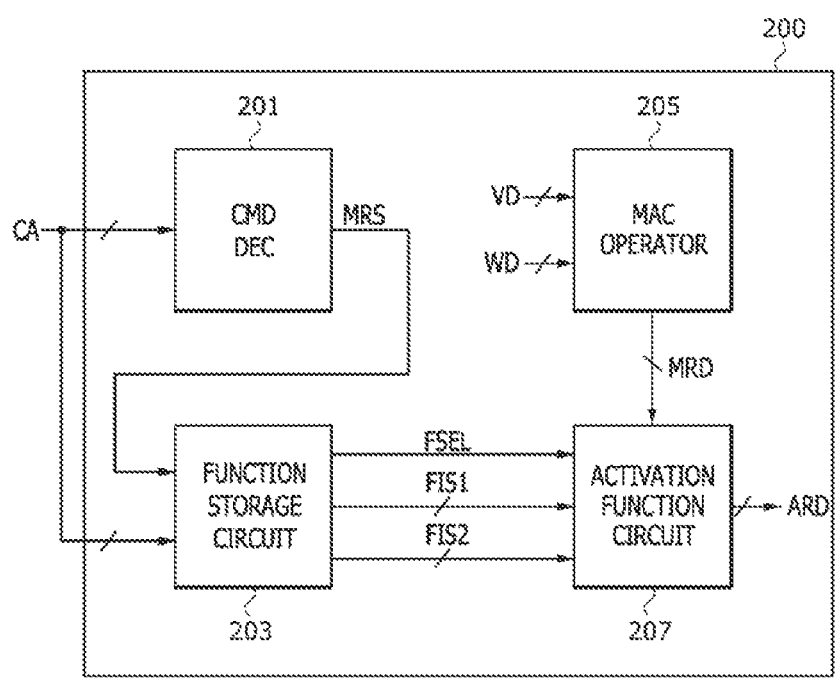
FIG. 10 is a block diagram illustrating a configuration of an arithmetic device according to yet another embodiment of the present disclosure.

As illustrated in FIG. 10, an arithmetic device 200, according to yet another embodiment of the present disclosure, may include a command decoder (CMD DEC) 201, a function storage circuit 203, a MAC operator 205, and an activation function (AF) circuit 207.

The command decoder 201 may receive an external set signal CA from an external device that is coupled to the arithmetic device 200. The external set signal CA may include a command and an address. Although the present embodiment illustrates a case in which the command and the address that are included in the external set signal CA are transmitted through the same transmission line, the present embodiment may be merely an example of the present disclosure. Thus, in some other embodiments, the command and the address that are included in the external set signal CA may be transmitted through two separate transmission lines, respectively. The external set signal CA may include a plurality of bits. The command decoder 201 may decode the external set signal CA to generate a mode register set signal MRS. The mode register set signal MRS may be activated to execute a mode register set operation. The mode register set operation may be performed to store a function-related signal in the function storage circuit 203. The function-related signal may include a function selection signal FSEL, a first function information signal FIS1, and a second function information signal FIS2, which are extracted from the external set signal CA.

The function storage circuit 203 may receive the mode register set signal MRS from the command decoder 201 and may receive the external set signal CA from the external device. The function storage circuit 203 may be designed to include a plurality of registers. When the mode register set signal MRS that is input to the function storage circuit 203 is activated to perform the mode register set operation, the function storage circuit 203 may extract the function selection signal FSEL, the first function information signal FIS1, and the second function information signal FIS2 from the external set signal CA, which is then stored and output to the AF circuit 207. The function selection signal FSEL may be activated to enter a function setting mode in which one of first to third activation functions is applied to a MAC result data MRD that is output from the MAC operator 205. In the present embodiment, the first activation function may be set as a rectified linear unit (ReLU) function, the second activation function may be set as a Leaky ReLU function, and the third activation function may be set as a ReLU-MAX function. The first function information signal FIS1 may be generated to set a slope value of the Leaky ReLU function. The slope value that is set by the first function information signal FIS1 may be applied to a negative input region of the Leaky ReLU function. For example, at least one of the ReLU function and the ReLU-MAX function may be applied to the MAC result data MRD when the slope value that is set by the first function information signal FIS1 is zero, and the Leaky ReLU function may be applied to the MAC result data MRD when the slope value that is set by the first function information signal FIS1 is non-zero. The second function information signal FIS2 may be generated to set a maximum value of the ReLU-MAX function. The maximum value that is set by the second function information signal FIS2 may be applied to a positive input region of the ReLU-MAX function. For example, at least one of the ReLU function and the Leaky ReLU function may be applied to the MAC result data MRD when the maximum value is not set by the second function information signal FIS2, and the ReLU-MAX function may be applied to the MAC result data MRD when the maximum value is set by the second function information signal FIS2.

The MAC operator 205 may receive a vector data VD and a weight data WD. The MAC operator 205 may perform a MAC arithmetic operation with the vector data VD and the weight data WD to generate the MAC result data MRD. The MAC operator 205 may output the MAC result data MRD to the AF circuit 207.

The AF circuit 207 may receive the function selection signal FSEL, the first function information signal FIS1, and the second function information signal FIS2 from the function storage circuit 203 and may receive the MAC result data MRD from the MAC operator 205. The AF circuit 207 may enter the function setting mode to apply one of the first to third activation functions (e.g., the ReLU function, the Leaky ReLU function, and the ReLU-MAX function) to the MAC result data MRD when the function selection signal FSEL is activated. The AF circuit 207 may set the slope value of the Leaky ReLU function, which is applied in the function setting mode, based on the first function information signal FIS1. The AF circuit 207 may set the maximum value of the ReLU-MAX function, which is applied in the function setting mode, based on the second function information signal FIS2. In the function setting mode, which is set by activating the function selection signal FSEL, the AF circuit 207 may apply one of the ReLU function, the Leaky ReLU function, and the ReLU-MAX function to the MAC result data MRD based on the first function information signal FIS1 and the second function information signal FIS2 to generate an activation function result data ARD. For example, the AF circuit 207 may apply the ReLU function to the MAC result data MRD to generate the activation function result data ARD when the slope value is set as zero by the first function information signal FIS1 and the maximum value is not set by the second function information signal FIS2 in the function setting mode. Meanwhile, the AF circuit 207 may apply the Leaky ReLU function to the MAC result data MRD to generate the activation function result data ARD when the slope value is set as non-zero by the first function information signal FIS1 and the maximum value is not set by the second function information signal FIS2. Moreover, the AF circuit 207 may apply the ReLU-MAX function to the MAC result data MRD to generate the activation function result data ARD when the slope value is set as zero by the first function information signal FIS1 and the maximum value is set by the second function information signal FIS2.

Figure 11:
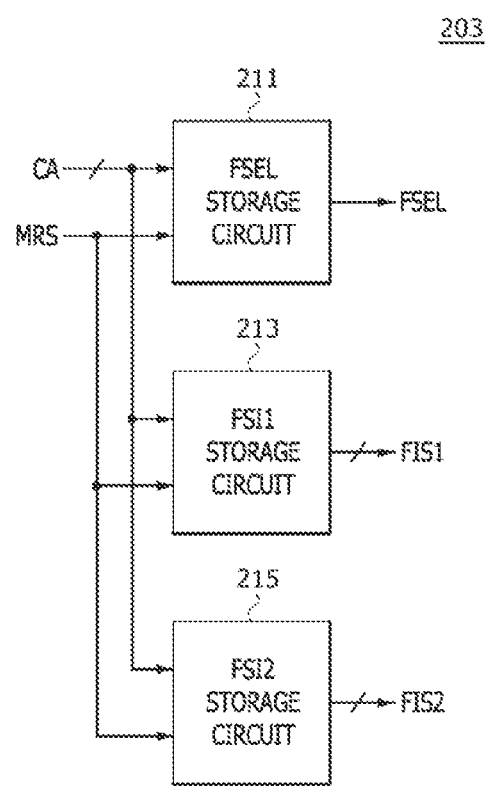
FIG. 11 is a block diagram illustrating a configuration of an example of a function storage circuit included in the arithmetic device illustrated in FIG. 10.

As illustrated in FIG. 11, the function storage circuit 203 may include a function selection signal storage circuit 211, a first function information signal storage circuit 213, and a second function information signal storage circuit 215. Each of the function selection signal storage circuit 211, the first function information signal storage circuit 213, and the second function information signal storage circuit 215 may include a register.

The function selection signal storage circuit 211 may receive the mode register set signal MRS from the command decoder 201 and may receive the external set signal CA from the external device. The function selection signal storage circuit 211 may extract the function selection signal FSEL from the external set signal CA to store the function selection signal FSEL during the mode register set operation, which is performed by activating the mode register set signal MRS. The function selection signal FSEL may be activated to enter the function setting mode to apply one of the ReLU function, the Leaky ReLU function, and the ReLU-MAX function to the MAC result data MRD. The function selection signal storage circuit 211 may output the function selection signal FSEL, which is stored during the mode register set operation. The logic levels and the number of bits that are used to generate the function selection signal FSEL, among bits that are included in the external set signal CA, may be set to be different according to the embodiments.

The first function information signal storage circuit 213 may receive the mode register set signal MRS from the command decoder 201 and may receive the external set signal CA from the external device. The first function information signal storage circuit 213 may extract the first function information signal FIS1 from the external set signal CA to store the first function information signal FIS1 during the mode register set operation, which is performed by activating the mode register set signal MRS. The logic level combination of bits that is included in the first function information signal FIS1 may be set to correspond to the slope value of the Leaky ReLU function. The first function information signal storage circuit 213 may output the first function information signal FIS1, which is stored during the mode register set operation. The logic levels and the number of bits that are used to generate the first function information signal FIS1, among bits that are included in the external set signal CA, may be set to be different according to the embodiments.

The second function information signal storage circuit 215 may receive the mode register set signal MRS from the command decoder 201 and may receive the external set signal CA from the external device. The second function information signal storage circuit 215 may extract the second function information signal FIS2 from the external set signal CA to store the second function information signal FIS2 during the mode register set operation, which is performed by activating the mode register set signal MRS. The logic level combination of bits that are included in the second function information signal FIS2 may be set to correspond to the maximum value of the ReLU-MAX function. The second function information signal storage circuit 215 may output the second function information signal FIS2, which is stored during the mode register set operation. The logic levels and the number of bits that are used to generate the second function information signal FIS2, among bits that are included in the external set signal CA, may be set to be different according to the embodiments.

Figure 12:
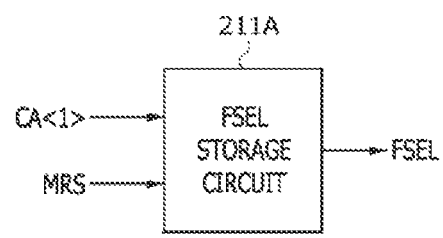
FIG. 12 is a block diagram illustrating a configuration of an example of a function selection signal storage circuit included in the function storage circuit illustrated in FIG. 11.

Referring to FIG. 12, a function selection signal storage circuit 211A, corresponding to another example of the function selection signal storage circuit 211, is illustrated. The function selection signal storage circuit 211A may generate the function selection signal FSEL based on the mode register set signal MRS and a first bit CA<1> of the external set signal CA. The function selection signal storage circuit 211A may generate the function selection signal FSEL from the first bit CA<1> of the external set signal CA during the mode register set operation, which is performed by activating the mode register set signal MRS. The function selection signal storage circuit 211A may buffer the first bit CA<1> of the external set signal CA to generate the function selection signal FSEL.

Referring to FIG. 13, the relationship between the first bit CA<1> of the external set signal CA and the function selection signal FSEL in the function selection signal storage circuit 211A is illustrated. The function selection signal storage circuit 211A may generate the function selection signal FSEL, which is deactivated to a logic "low(L)" level when the first bit CA<1> of the external set signal CA that is input to the function selection signal storage circuit 211A has a logic "low(L)" level. When the function selection signal FSEL is deactivated, the arithmetic device 200 may exit the function setting mode in which one of the first to third activation functions (e.g., the ReLU function, the Leaky ReLU function, and the ReLU-MAX function) is applied to the MAC result data MRD. Meanwhile, the function selection signal storage circuit 211A may generate the function selection signal FSEL, which is activated to a logic "high(H)" level when the first bit CA<1> of the external set signal CA that is input to the function selection signal storage circuit 211A has a logic "high(H)" level. When the function selection signal FSEL is activated, the arithmetic device 200 may enter the function setting mode in which one of the first to third activation functions (e.g., the ReLU function, the Leaky ReLU function, and the ReLU-MAX function) is applied to the MAC result data MRD.

Figure 14:
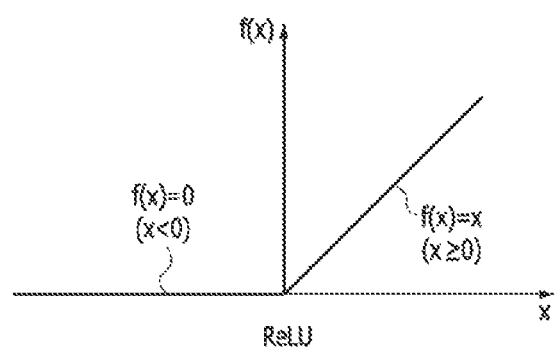
FIG. 14 is a graph illustrating a ReLU function that is set in a function set mode activated by the function selection signal storage circuit illustrated in FIG. 12.

Referring to FIG. 14, the ReLU function that is applied in the function setting mode is illustrated. The ReLU function may have a function value f(x), which is set to be zero in a negative input region (x<0) and set to be equal to an input value "x" when the input value "x" has zero or a positive value. In order to set the ReLU function that is applied in the function setting mode, the slope value has to be set as zero by the first function information signal FIS1 and the maximum value should not be set by the second function information signal FIS2 while the function selection signal FSEL is activated.

Figure 15:
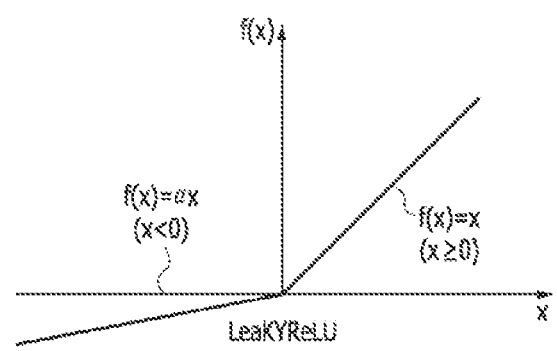
FIG. 15 is a graph illustrating a Leaky ReLU function that is set in a function set mode activated by the function selection signal storage circuit illustrated in FIG. 12.

Referring to FIG. 15, the Leaky ReLU function that is applied in the function setting mode is illustrated. The Leaky ReLU function may have a function value f(x), which is set as 'ax' by multiplying an input value "x" and the slope value "a" in a negative input region (x<0) and set to be equal to the input value "x" when the input value "x" has zero or a positive value. The slope value "a" may be set by the first function information signal FIS1. In order to set the Leaky ReLU function that is applied in the function setting mode, the slope value has to be set as non-zero by the first function information signal FIS1 and the maximum value should not be set by the second function information signal FIS2 while the function selection signal FSEL is activated.

Figure 16:
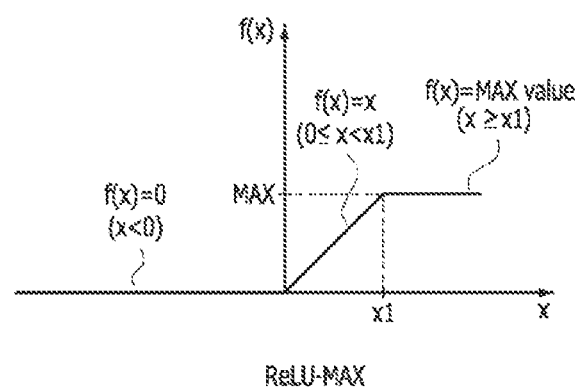
FIG. 16 is a graph illustrating a ReLU-MAX function that is set in a function set mode activated by the function selection signal storage circuit illustrated in FIG. 12.

Referring to FIG. 16, the ReLU-MAX function that is applied in the function setting mode is illustrated. The ReLU-MAX function may have a function value f(x), which is set as zero in a negative input region (x<0) and set to be equal to the input value "x" in a first positive input region (0≤x≤x1) in which the input value "x" is equal to or greater than zero and less than "x1", and which is set as a maximum value "MAX" in a second positive input region (x1≤x) in which the input value "x" is equal to or greater than "x1". The maximum value "MAX" may be set by the second function information signal FIS2. In order to set the ReLU-MAX function that is applied in the function setting mode, the slope value has to be set as zero by the first function information signal FIS1 and the maximum value has to be set by the second function information signal FIS2 while the function selection signal FSEL is activated.

Figure 17:
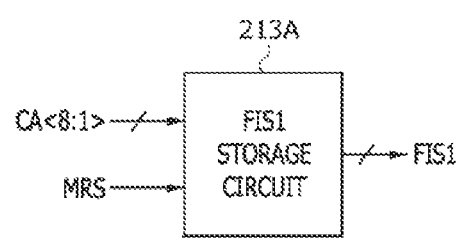
FIG. 17 is a block diagram illustrating a configuration of an example of a first function information signal storage circuit included in the function storage circuit illustrated in FIG. 11.

Referring to FIG. 17, a first function information signal storage circuit 213A that corresponds to another example of the first function information signal storage circuit 213, illustrated in FIG. 11, is illustrated. The first function information signal storage circuit 213A may generate the first function information signal FIS1 based on the mode register set signal MRS and first to eighth bits CA<8:1> of the external set signal CA. The first function information signal storage circuit 213A may generate the first function information signal FIS1 based on the first to eighth bits CA<8:1> of the external set signal CA during the mode register set operation, which is performed by activating the mode register set signal MRS. The number of bits that are included in the first function information signal FIS1 may be set to be different according to the embodiments.

Referring to FIG. 18, the relationship between the logic level combination of the first to eighth bits CA<8:1> of the external set signal CA that is input to the first function information signal storage circuit 213A and the slope value of the Leaky ReLU function is illustrated. For example, when the first to eighth bits CA<8:1> of the external set signal CA are set to have a logic level combination of '00110001', the Leaky ReLU function may be set to have a negative slope value of '−0.00110001' in the negative input region.

Figure 19:
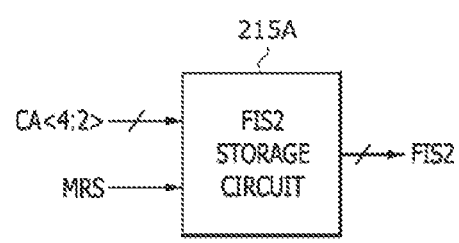
FIG. 19 is a block diagram illustrating a configuration of an example of a second function information signal storage circuit included in the function storage circuit illustrated in FIG. 11.

Referring to FIG. 19, a second function information signal storage circuit 215A that corresponds to another example of the second function information signal storage circuit 215, illustrated in FIG. 11, is illustrated. The second function information signal storage circuit 215A may generate the second function information signal FIS2 based on the mode register set signal MRS and the second to fourth bits CA<4:2> of the external set signal CA. The second function information signal storage circuit 215A may generate the second function information signal FIS2 based on the second to fourth bits CA<4:2> of the external set signal CA during the mode register set operation, which is performed by activating the mode register set signal MRS. The number of bits that are included in the second function information signal FIS2 may be set to be different according to the embodiments.

Referring to FIG. 20, the relationship between the logic level combination of the second to fourth bits CA<4:2> of the external set signal CA that is input to the second function information signal storage circuit 215A and the maximum value of the ReLU-MAX function is illustrated. For example, the maximum value of the ReLU-MAX function may be set to have a decimal number of '1' when the second to fourth bits CA<4:2> of the external set signal CA are set to have a logic level combination of '001', and the maximum value of the ReLU-MAX function may be set to have a decimal number of '2' when the second to fourth bits CA<4:2> of the external set signal CA are set to have a logic level combination of '010'. In addition, the maximum value of the ReLU-MAX function may be set to have a decimal number of '3' when the second to fourth bits CA<4:2> of the external set signal CA are set to have a logic level combination of '011', the maximum value of the ReLU-MAX function may be set to have a decimal number of '4' when the second to fourth bits CA<4:2> of the external set signal CA are set to have a logic level combination of '100', and the maximum value of the ReLU-MAX function may be set to have a decimal number of '5' when the second to fourth bits CA<4:2> of the external set signal CA are set to have a logic level combination of '101'. Moreover, the maximum value of the ReLU-MAX function may be set to have a decimal number of '6' when the second to fourth bits CA<4:2> of the external set signal CA are set to have a logic level combination of '110', and the maximum value of the ReLU-MAX function may be set to have a decimal number of '7' when the second to fourth bits CA<4:2> of the external set signal CA are set to have a logic level combination of '111'. Meanwhile, when the second to fourth bits CA<4:2> of the external set signal CA are set to have a logic level combination of '000', the maximum value of the ReLU-MAX function is not set.

Figure 21:
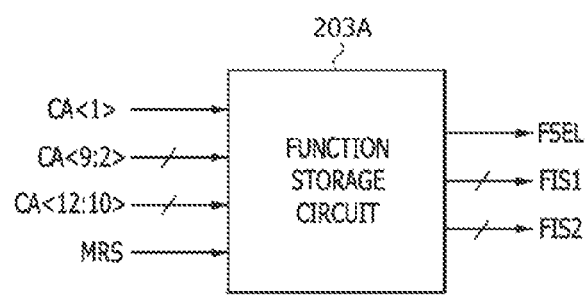
FIG. 21 is a block diagram illustrating a configuration of another example of a function storage circuit included in the arithmetic device illustrated in FIG. 10.

Referring to FIG. 21, the function storage circuit 203A that corresponds to another example of the function storage circuit 203, illustrated in FIG. 11, may receive the mode register set signal MRS from the command decoder 201 and may receive first to twelfth bits CA<12:1> of the external set signal CA from the external device. The function storage circuit 203A may extract the function selection signal FSEL from the first bit CA<1> of the external set signal CA and may store the function selection signal FSEL in order to enter the function setting mode to apply one of the first to third activation functions (e.g., the ReLU function, the Leaky ReLU function, and the ReLU-MAX function) during the mode register set operation, which is performed by activating the mode register set signal MRS. The function storage circuit 203A may extract the first function information signal FIS1 to set the slope value of the Leaky ReLU function based on the second to ninth bits CA<9:2> of the external set signal CA to store the first function information signal FIS1 during the mode register set operation. The function storage circuit 203A may extract the second function information signal FIS2 to set the maximum value of the ReLU-MAX function based on the tenth to twelfth bits CA<12:10> of the external set signal CA to store the second function information signal FIS2 during the mode register set operation. The function storage circuit 203A may output the function selection signal FSEL, the first function information signal FIS1, and the second function information signal FIS2 during the mode register set operation.

Figure 22:
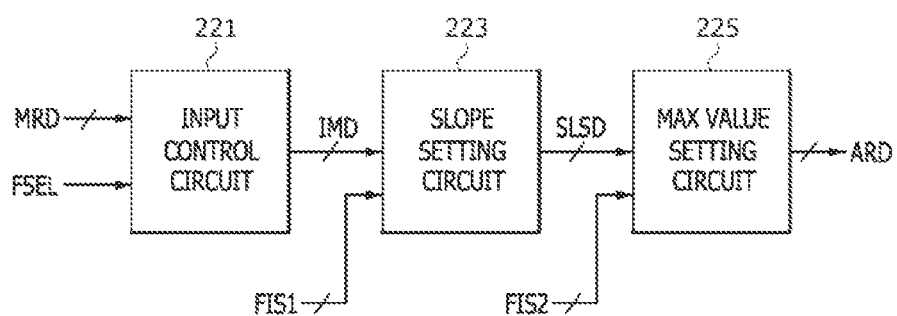
FIG. 22 is a block diagram illustrating a configuration of an example of an activation function (AF) circuit included in the arithmetic device illustrated in FIG. 10.

As illustrated in FIG. 22, the AF circuit 207 may include an input control circuit 221, a slope setting circuit 223, and a maximum value setting circuit 225.

The input control circuit 221 may generate a MAC data IMD based on the MAC result data MRD and the function selection signal FSEL. The input control circuit 221 may buffer the MAC result data MRD to output the buffered data of the MAC result data MRD as the MAC data IMD when the function selection signal FSEL is activated. The input control circuit 221 may receive the MAC result data MRD to generate the MAC data IMD in order to apply one of the first to third activation functions (e.g., the ReLU function, the Leaky ReLU function, and the ReLU-MAX function) to the MAC result data MRD when the mode register set operation is performed by activating the function selection signal FSEL.

The slope setting circuit 223 may receive the MAC data IMD from the input control circuit 221. The slope setting circuit 223 may set the slope value, which is applied in the negative input region, based on the MAC data IMD and the first function information signal FIS1. The slope setting circuit 223 may determine whether a logic level combination of bits, included in the MAC data IMD, corresponds to an input value that is included in the negative input region and may generate a slope set data SLSD based on the MAC data IMD. When a logic level combination of bits, included in the MAC data IMD, corresponds to an input value that is included in the negative input region, the slope setting circuit 223 may generate the slope set data SLSD with bits having a logic level combination that corresponds to a result value that is obtained by multiplying the slope value of the Leaky ReLU function, set by the first function information signal FIS1, with the input value, corresponding to the logic level combination of bits that is included in the MAC data IMD. The slope setting circuit 223 may output the MAC data IMD as the slope set data SLSD when the logic level combination of bits, included in the MAC data IMD, corresponds to an input value that is equal to or greater than zero.

The maximum value setting circuit 225 may receive the slope set data SLSD from the slope setting circuit 223. The maximum value setting circuit 225 may generate the activation function result data ARD by setting the maximum value of the activation function in a positive input region based on the slope set data SLSD and the second function information signal FIS2. The maximum value setting circuit 225 may output the slope set data SLSD as the activation function result data ARD when the logic level combination of the slope set data SLSD corresponds to an input value that is included in the negative input region. The maximum value setting circuit 225 may output the slope set data SLSD as the activation function result data ARD when the maximum value of the activation function is not set based on the second function information signal FIS2. The maximum value setting circuit 225 may output the slope set data SLSD as the activation function result data ARD when the logic level combination of the slope set data SLSD corresponds to an input value that is included in a positive input region and the input value that corresponds to the slope set data SLSD is less than the maximum value, which is set by the second function information signal FIS2. The maximum value setting circuit 225 may output the second function information signal FIS2 as the activation function result data ARD when the logic level combination of the slope set data SLSD corresponds to an input value included in the positive input region and the input value that corresponds to the slope set data SLSD is equal to or greater than the maximum value, which is set by the second function information signal FIS2.

As described above, the AF circuit 207 may generate the activation function result data ARD by sequentially applying the slope value of the Leaky ReLU function, set by the first function information signal FIS1, and the maximum value of the ReLU-MAX function, set by the second function information signal FIS2, to the MAC result data MRD when the function selection signal FSEL is activated to enter the function setting mode. As such, the AF circuit 207 may selectively apply the ReLU function, the Leaky ReLU function, and the ReLU-MAX function to the MAC result data MRD by using only the function selection signal FSEL, the first function information signal FIS1, and the second function information signal FIS2. The AF circuit 207 does not need to store the ReLU function, the Leaky ReLU function, and the ReLU-MAX function in a specific form, such as a look-up table form. Thus, it may be possible to minimize a size of a storage space for storing the activation functions.

Figure 23:
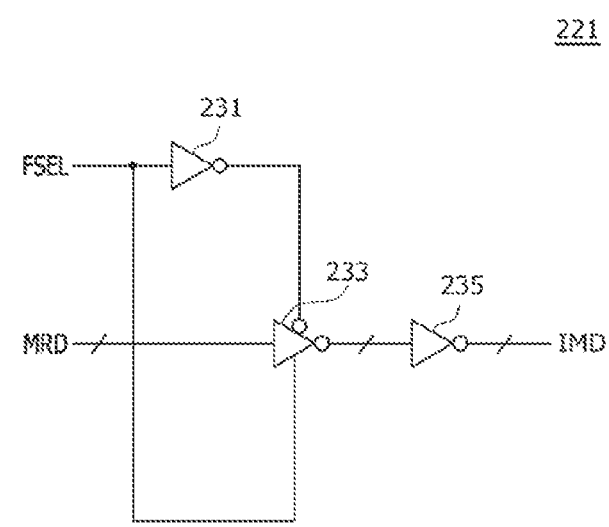
FIG. 23 is a circuit diagram illustrating an example of an input control circuit included in the AF circuit illustrated in FIG. 22.

Referring to FIG. 23, the input control circuit 221 may include inverters 231, 233, and 235. The inverter 231 may inversely buffer the function selection signal FSEL to output the inversely buffered signal of the function selection signal FSEL. The inverter 233 may inversely buffer the MAC result data MRD based on an output signal of the inverter 231 to output the inversely buffered signal of the MAC result data MRD. The inverter 233 may inversely buffer the MAC result data MRD to output the inversely buffered data of the MAC result data MRD when the function selection signal FSEL is activated to a logic "high" level. The inverter 233 may interrupt the input of the MAC result data MRD when the function selection signal FSEL is deactivated to a logic "low" level. The inverter 235 may inversely buffer an output signal of the inverter 233 to output the inversely buffered signal of the output signal of the inverter 233 as the MAC data IMD. The input control circuit 221 may buffer the MAC result data MRD by using the inverters 233 and 235 to output the buffered data of the MAC result data MRD as the MAC data IMD when the function selection signal FSEL is activated to a logic "high" level.

Figure 24:
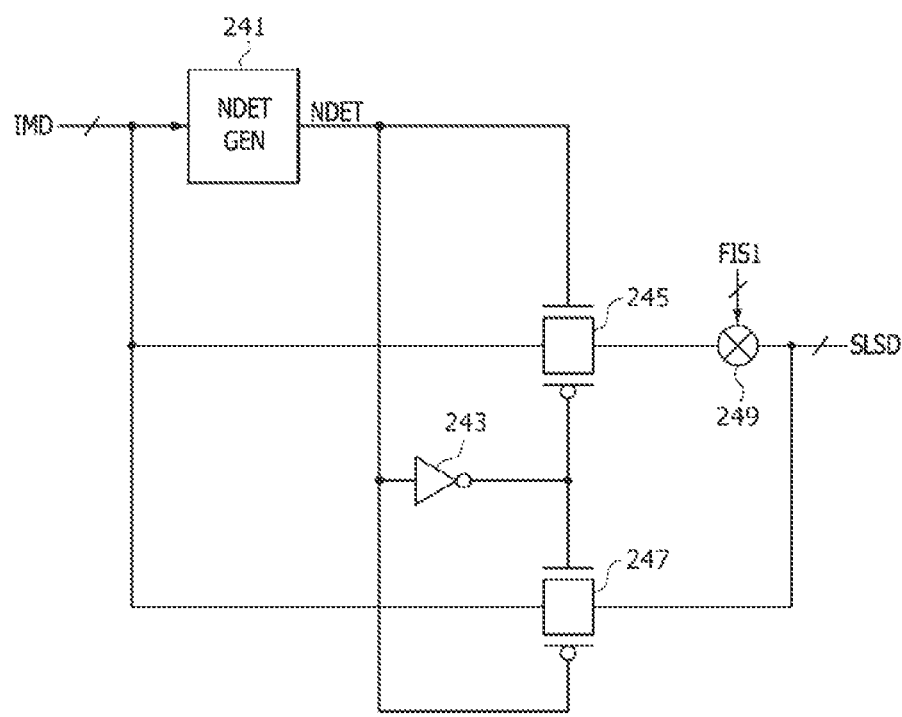
FIG. 24 illustrates an example of a slope setting circuit included in the AF circuit illustrated in FIG. 22.

Referring to FIG. 24, the slope setting circuit 223 may include a detection signal generation circuit (NDET GEN) 241, an inverter 243, transfer gates 245 and 247, and a multiplier 249. The detection signal generation circuit 241 may generate a detection signal NDET based on the MAC data IMD. The detection signal generation circuit 241 may generate the detection signal NDET, which is activated to a logic "high" level when a logic level combination of bits, included in the MAC data IMD, corresponds to an input value that is included in the negative input region of the activation function. The detection signal generation circuit 241 may generate the detection signal NDET which is deactivated to a logic "low" level when a logic level combination of bits, included in the MAC data IMD, corresponds to an input value that is equal to or greater than zero. The inverter 243 may inversely buffer the detection signal NDET to output the inversely buffered signal of the detection signal NDET. The transfer gate 245 may output the MAC data IMD to the multiplier 249 when the detection signal NDET is activated to a logic "high" level. The transfer gate 247 may output the MAC data IMD to the slope set data SLSD when the detection signal NDET is deactivated to a logic "low" level. The multiplier 249 may perform a multiplying operation that multiplies the slope value of the Leaky ReLU function, which is set by the first function information signal FIS1, with the input value that corresponds to the logic level combination of bits, included in the MAC data IMD, when the detection signal NDET is activated to a logic "high" level. The multiplier 249 may generate the slope set data SLSD with bits having a logic level combination that corresponds to a result of the multiplying operation of the multiplier 249.

Figure 25:
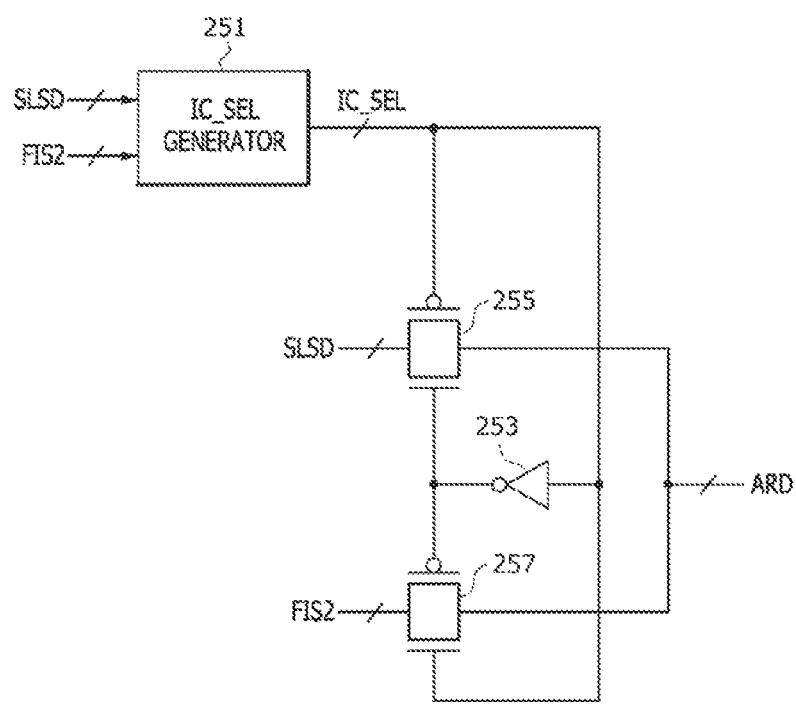
FIG. 25 illustrates an example of a max value setting circuit included in the AF circuit illustrated in FIG. 22.

Referring to FIG. 25, the maximum value setting circuit 225 may include an input control/selection signal generator 251, an inverter 253, and transfer gates 255 and 257.

The input control/selection signal generator 251 may generate an input control/selection signal IC_SEL based on the slope set data SLSD and the second function information signal FIS2. The input control/selection signal generator 251 may generate the input control/selection signal IC_SEL, which is deactivated to a logic "low" level when a logic level combination of bits, included in the slope set data SLSD, corresponds to an input value that is included in the negative input region of the activation function. The input control/selection signal generator 251 may generate the input control/selection signal IC_SEL, which is deactivated to a logic "low" level when the maximum value of the activation function is not set by the second function information signal FIS2. The input control/selection signal generator 251 may generate the input control/selection signal IC_SEL, which is deactivated to a logic "low" level when the logic level combination of the slope set data SLSD corresponds to an input value that is included in a positive input region of the activation function and an input value that corresponds to the slope set data SLSD is less than the maximum value that is set by the second function information signal FIS2. The input control/selection signal generator 251 may generate the input control/selection signal IC_SEL, which is activated to a logic "high" level when the logic level combination of the slope set data SLSD corresponds to an input value that is included in the positive input region of the activation function and an input value that corresponds to the slope set data SLSD is equal to or greater than the maximum value that is set by the second function information signal FIS2.

The inverter 253 may inversely buffer the input control/selection signal IC_SEL to output the inversely buffered signal of the input control/selection signal IC_SEL. The transfer gate 255 may output the slope set data SLSD as the activation function result data ARD when the input control/selection signal IC_SEL is deactivated to a logic "low" level. The transfer gate 255 may output the slope set data SLSD as the activation function result data ARD when (1) a logic level combination of bits that is included in the slope set data SLSD corresponds to an input value that is included in the negative input region of the activation function, (2) the maximum value of the activation function is not set by the second function information signal FIS2, or (3) the logic level combination of bits that is included in the slope set data SLSD corresponds to an input value that is included in the positive input region of the activation function and the input value that corresponds to the slope set data SLSD is less than the maximum value, which is set by the second function information signal FIS2. The transfer gate 257 may output the second function information signal FIS2 as the activation function result data ARD when the input control/selection signal IC_SEL is activated to a logic "high" level. The transfer gate 257 may output the second function information signal FIS2 as the activation function result data ARD when the logic level combination of bits, included in the slope set data SLSD, corresponds to an input value that is included in the positive input region of the activation function and the input value that corresponds to the slope set data SLSD is equal to or greater than the maximum value, which is set by the second function information signal FIS2.

Figure 26:
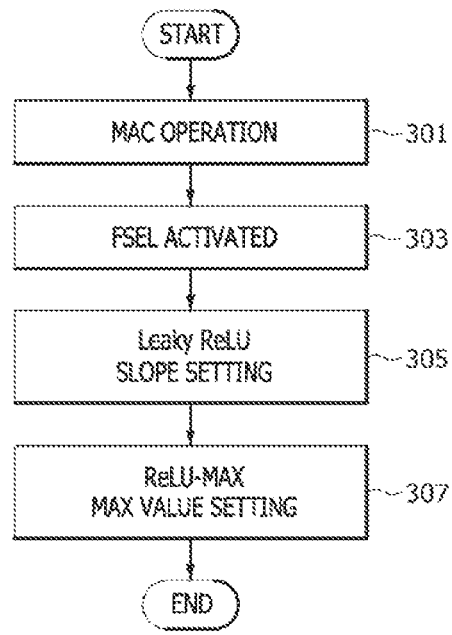
FIG. 26 is a flowchart illustrating an operation of the AF circuit illustrated in FIG. 22.

An operation of the AF circuit 207 with the aforementioned configuration will be described hereinafter with reference to FIG. 26.

First, the MAC arithmetic operation may be performed with the vector data VD and the weight data WD to generate the MAC result data MRD (see a step 301).

Next, when the function selection signal FSEL is activated, the arithmetic device 200 may enter the function setting mode in which one of the first to third activation functions (e.g., the ReLU function, the Leaky ReLU function, and the ReLU-MAX function) is applicable to the MAC result data MRD (see a step 303). In the function setting mode, the MAC data IMD may be generated from the MAC result data MRD.

Next, when the slope value of the Leaky ReLU function is set based of the first function information signal FIS1, the slope set data SLSD may be generated by applying the slope value of the Leaky ReLU function to the MAC data IMD (see a step 305). Applying the slope value of the Leaky ReLU function to the MAC data IMD may be executed by multiplying the slope value, which is set by the first function information signal FIS1, with the input value that is included in the negative input region, corresponding to the logic level combination of bits that is included in the MAC data IMD.

Finally, when the maximum value of the ReLU-MAX function is set based on the second function information signal FIS2, the activation function result data ARD may be generated by using the maximum value of the ReLU-MAX function (see a step 307). The maximum value of the ReLU-MAX function may be used by outputting the second function information signal FIS2 as the activation function result data ARD when the logic level combination of bits, included in the slope set data SLSD, corresponds to an input value that is included in the positive input region of the activation function and the input value that corresponds to the slope set data SLSD is equal to or greater than the maximum value, which is set by the second function information signal FIS2.

What is claimed is:

1. An arithmetic device comprising:
   a function storage circuit configured to store and output an electrical signal including a function selection signal, a first function information signal, and a second function information signal; and
   an activation function (AF) circuit configured to receive the electrical signal and propagate the electrical signal through the AF circuit to generate an activation function result data by applying a slope value and a maximum value to a multiplication/accumulation (MAC) result data in a function setting mode that is activated by the function selection signal, wherein the slope value is set based on the first function information signal, and the maximum value is set based on the second function information signal.

2. The arithmetic device of claim 1, wherein the function storage circuit is configured to extract the function selection signal, the first function information signal, and the second function information signal from an external set signal during a mode register set operation.

3. The arithmetic device of claim 1, wherein the function storage circuit includes:
   a first register configured to store and output the function selection signal;
   a second register configured to store and output the first function information signal; and
   a third register configured to store and output the second function information signal.

4. The arithmetic device of claim 1, wherein the function storage circuit includes a register configured to store and output the function selection signal, the first function information signal, and the second function information signal.

5. The arithmetic device of claim 1, wherein the function setting mode is activated to apply activation functions to the MAC result data.

6. The arithmetic device of claim 5, wherein the activation functions include a rectified linear unit (ReLU) function, a leaky rectified linear unit (Leaky ReLU) function, and a ReLU-MAX function.

7. The arithmetic device of claim 1, further comprising a MAC operator configured to perform a MAC arithmetic operation for a vector data and a weight data to generate the MAC result data.

8. The arithmetic device of claim 1, wherein the AF circuit includes an input control circuit configured to generate a MAC data based on the function selection signal and the MAC result data.

9. The arithmetic device of claim 8, wherein the input control circuit buffers the MAC result data to generate the MAC data when the function selection signal is activated to enter the function setting mode.

10. The arithmetic device of claim 8, wherein the AF circuit further includes a slope setting circuit that is configured to generate a slope set data by applying the slope value to the MAC data based on the first function information signal.

11. The arithmetic device of claim 10, wherein the slope setting circuit generates the slope set data by multiplying the slope value, which is set by the first function information signal, by an input value that corresponds to a logic level combination of bits, included in the MAC data, when the logic level combination of the bits, included in the MAC data, corresponds to an input value that is included in a negative input region.

12. The arithmetic device of claim 10, wherein the slope setting circuit outputs the MAC data as the slope set data when a logic level combination of bits that is included in the MAC data corresponds to an input value that is equal to or greater than zero.

13. The arithmetic device of claim 10, wherein the AF circuit further includes a maximum value setting circuit configured to generate an activation function result data by applying the maximum value to the slope set data based on the second function information signal.

14. The arithmetic device of claim 13, wherein the maximum value setting circuit outputs the second function information signal as the activation function result data when:
   a logic level combination of bits, included in the slope set data, corresponds to an input value that is included in a positive input region; and
   the input value that corresponds to the slope set data is equal to or greater than the maximum value.

15. The arithmetic device of claim 13, wherein the maximum value setting circuit outputs the slope set data as the activation function result data when a logic level combination of bits that is included in the slope set data corresponds to an input value that is included in a negative input region.

16. The arithmetic device of claim 13, wherein the maximum value setting circuit outputs the slope set data as the activation function result data when the maximum value is not set.

17. The arithmetic device of claim 13, wherein the maximum value setting circuit outputs the slope set data as the activation function result data when:
   a logic level combination of bits included in the slope set data corresponds to an input value included in a positive input region; and
   the input value that corresponds to the slope set data is less than the maximum value.

18. An arithmetic device comprising:
   an input control circuit configured to receive an electrical signal including MAC result data and propagate the electrical signal through the input control circuit to generate multiplication/accumulation (MAC) data based on a function selection signal and the MAC result data;
   a slope setting circuit configured to generate a slope set data by applying a slope value to the MAC data based on a first function information signal; and a maximum value setting circuit configured to generate an activation function result data by applying a maximum value to the slope set data based on a second function information signal.

19. The arithmetic device of claim 18, further comprising a function storage circuit configured to store and output the function selection signal, the first function information signal, and the second function information signal.

20. The arithmetic device of claim 18, wherein the input control circuit is configured to receive the MAC result data in a function setting mode, which is activated based on the function selection signal.

21. The arithmetic device of claim 20, wherein the function setting mode is activated to apply activation functions to the MAC result data.

22. The arithmetic device of claim 18, wherein the input control circuit buffers the MAC result data to generate the MAC data when the function selection signal is activated to enter a function setting mode.

23. The arithmetic device of claim 18, wherein the slope setting circuit generates the slope set data by multiplying the slope value, which is set by the first function information signal, by an input value that corresponds to a logic level combination of bits, included in the MAC data, when the logic level combination of the bits, included in the MAC data, corresponds to an input value that is included in a negative input region.

24. The arithmetic device of claim 18, wherein the slope setting circuit outputs the MAC data as the slope set data when a logic level combination of bits that is included in the MAC data corresponds to an input value that is equal to or greater than zero.

25. The arithmetic device of claim 18, wherein the maximum value setting circuit outputs the second function information signal as the activation function result data when:
   a logic level combination of bits included in the slope set data corresponds to an input value included in a positive input region; and
   the input value that corresponds to the slope set data is equal to or greater than the maximum value.

26. The arithmetic device of claim 18, wherein the maximum value setting circuit outputs the slope set data as the activation function result data when a logic level combination of bits that is included in the slope set data corresponds to an input value that is included in a negative input region.

27. The arithmetic device of claim 18, wherein the maximum value setting circuit outputs the slope set data as the activation function result data when the maximum value is not set.

28. The arithmetic device of claim 18, wherein the maximum value setting circuit outputs the slope set data as the activation function result data when:
   a logic level combination of bits included in the slope set data corresponds to an input value included in a positive input region; and
   the input value that corresponds to the slope set data is less than the maximum value.

29. An arithmetic device comprising:
   a slope setting circuit configured to receive an electrical signal including multiplication/accumulation (MAC) data and propagate the electrical signal through the slope setting circuit, in a function setting mode, based on a function selection signal and a MAC result data to generate a slope set data by applying a slope value to the MAC data based on a first function information signal; and
   a maximum value setting circuit configured to generate an activation function result data by applying a maximum value to the slope set data based on a second function information signal.

* * * * *